United States Patent Office 3,294,825
Patented Dec. 27, 1966

3,294,825
METHOD FOR PROTECTING LIPIDS AGAINST OXIDATION
Pierre André Pottier, 55 Rue des Belles Feuilles, Paris, France
No Drawing. Filed Apr. 8, 1960, Ser. No. 20,821
1 Claim. (Cl. 260—398.5)

It is well known that a great number of lipids contain unsaturated esters on account of which they deteriorate more or less rapidly by self-oxidation. It has been attempted to avoid this deterioration by adding antioxidants to such lipids, particularly ascorbic acid alone, or citric acid alone; however these acids present several disadvantages.

On the one hand, ascorbic acid is not soluble in lipids, and citric acid is soluble in lipids only to a very small extent; considerable difficulty is therefore encountered when it is attempted to achieve a homogeneous distribution of these acids in the lipids to be treated. On the other hand, the antioxidant power of these compounds is not very high, which leads to using them in comparatively large quantities.

It is an object of the present invention to provide a method for protecting lipids against oxidation, which essentially consists in distributing over the volume of lipid to be protected a mixture of ascorbic acid and citric acid, said acids thus being introduced simultaneously into the product to be protected.

In one advantageous embodiment of the invention, the ascorbic acid and the citric acid are first mixed with a fatty acid or a fatty ester, and the resulting mixture is introduced into the volume of lipid to be protected.

The method herein above defined is advantageously carried out in the following manner: first the ascorbic acid and the citric acid are mixed each separately with a portion of the fatty acid or the fatty ester; the two individual mixtures are then mixed with one another after complete fusion of each individual mixture, whereafter the resulting mixture is introduced into the lipid to be protected.

The applicant has in fact observed that, surprisingly, the ascorbic acid and the citric acid show synergetic properties, i.e. the antioxidant effect produced by the mixture of said acids is substantially stronger than the sum of the individual antioxidant effects of each one of said acids when considered separately.

The proportion of each one of the above mentioned acids (i.e. ascorbic acid and citric acid) in the mixture herein before defined (i.e. the mixture comprising the two acids and a fatty acid or an ester of a fatty acid) may vary between 1 and 18% by weight of the total amount of said mixture.

The method according to the invention may be carried out by using any fatty acid, preferably one having a molecular weight higher than 14, such as stearic acid, palmitic acid, lauric acid, linoleic acid, and so forth, said acid being used either in its primitive pure state, or after esterification by means of a polyalcohol of any desired type, e.g. glycerol, ethylene glycol, propylene glycol, diethylene glycol, triethylene glycol, or polyoxyethylene glycol. As far as the unsaturated fatty acids are concerned, the esters preferably used in carrying out the method according to the present invention are glycerol and glycol esters.

In a particularly advantageous embodiment of the invention, use is advantageously made of palmitic acid, or stearic acid, either pure, or in the form of glycerol mono-, di-, or tri-esters.

A mixture of fatty acids, or a mixture of esters of these acids may also be used.

The product according to the invention is prepared in the presence of an alcoholic solvent which may be constituted by a mono-alcohol of low molecular weight, such as ethanol, propanol, butanol, etc., or by a diol which may be either pure, or mono-esterified, such as ethanediol, propanediol, butanediol, etc.

The invention is illustrated hereinafter by several examples which are by no means limiting the scope of the invention. The amounts indicated in these examples are parts by weight.

*Example 1*

The following compounds were used:

|  | Parts |
|---|---|
| Ascorbic acid | 1 |
| Citric acid | 14 |
| Ethanol | 11 |
| Stearic acid or glycerol stearate | 85 |

In a fraction of the ethanol, the titre of which was comprised between 60 and 65°, the ascorbic acid was dissolved while being stirred and heated. After complete dissolution of the acid, a fraction of the stearic acid, or of the stearate, was added. The mixture was vigorously stirred at a temperature not exceeding 70° C., until as large an amount as possible of the solvent had evaporated. The resulting product was poured into a conical mould, where it was allowed to decant and to set by cooling. The solid mass was withdrawn from the mould, the residual products of decantation collected at the bottom of the mould were disposed of, and the solid moulded mass was washed in order to remove the fraction of products of decantation which adhered to its surface.

The citric acid was dissolved in the remaining volume of ethanol, and the same procedure as hereinbefore described was repeated after the remainder of stearic acid or stearate had been added to the solution of citric acid.

Two fractional products were thus obtained, which were then fused and mixed, whereafter the resulting final product was cast in conical moulds, and grated according to the particular requirements.

*Example 2*

Using the same procedure as indicated in the above Example 1, a mixture was prepared from the following components:

|  | Parts |
|---|---|
| Ascorbic acid | 14 |
| Citric acid | 1 |
| Butanol | 11 |
| Stearic acid, or glycerol stearate | 85 |

*Example 3*

For preparing a mixture according to the invention, the following compounds were used:

|  | Parts |
|---|---|
| Ascorbic acid | 3 |
| Citric acid | 12 |
| Propanol | 3 |
| Palmitic acid | 25 |
| Glycerol monostearate | 60 |

In this example, the ascorbic acid was dissolved in the propanol, while the citric acid was dissolved separately in the palmitic acid. With the exception of this variant, the procedure was the same as that described in the above Example 1.

*Example 4*

In this example the method according to the invention was carried out by using the following compounds:

|  | Parts |
|---|---|
| Butanediol | 20 |
| Ascorbic acid | 2 |
| Citric acid | 11 |
| Stearyle palmitate | 67 |

The butanediol was first heated to a temperature comprised between about 130° and 140° C. While vigorously stirring, the ascorbic acid was added in small fractional quantities. After the ascorbic acid was completely dissolved, the citric acid was added and allowed to dissolve, too, whereafter the temperature of the mixture was allowed to drop to about 80° C. The fatty acid, or its pre-fused ester was then added. Vigorous stirring was continued for about 30 minutes. The mixture was then introduced into a container where the excess solvent separated from the solid mass. After solidification of the fatty phase the resulting solid mass was withdrawn from the container and washed in order to eliminate the traces of solvent and residual products adhering to its surface.

*Example 5*

The following products were used:

| | Parts |
|---|---|
| Ethanediol | 5 |
| Ascorbic acid | 1 |
| Palmitic acid | 28 |
| Citric acid | 14 |
| Stearyle stearate | 52 | and the same procedure as that described in the above Example 4 was applied.

Experience has shown that the product according to the invention is active even when used in very small amounts, its threshold of activity being 0.03% of the amount of lipid to be protected.

Although specific embodiments of the present invention have been described hereinabove, it will be evident that various changes in the way of practicing it may be made within the spirit and scope of said invention.

What I claim is:

A method for protecting lipids containing unsaturated constituents against oxidation, which consists of distributing in the volume of the lipid to be protected a mixture consisting essentially of ascorbic acid, citric acid and a carrier selected from the group consisting of stearic acid, palmitic acid, lauric acid, linoleic acid, and an ester formed by said acid and a polyhydric alcohol selected from the group consisting of glycerol, ethylene glycol, propylene glycol, diethylene glycol, triethylene glycol or polyoxyethylene glycol, the weights of the ascorbic acid and the citric acid each being between 1% and 18% of the total weight of the mixture and the ingredients selected from said group making up the balance of said mixture, the amount of said mixture added to said lipid being in excess of 0.03% of said lipid.

References Cited by the Examiner

UNITED STATES PATENTS

| | | | |
|---|---|---|---|
| 2,155,731 | 4/1939 | Mitchell | 99—163 |
| 2,159,986 | 5/1939 | Gray et al. | 99—163 |
| 2,259,582 | 10/1941 | Perky et al. | |
| 2,511,804 | 6/1950 | Hall et al. | 99—163 |

FOREIGN PATENTS

| | | |
|---|---|---|
| 495,725 | 9/1953 | Canada. |
| 591,250 | 1/1960 | Canada. |

OTHER REFERENCES

Dud. and Eng. Chem., vol. 37, March 1945, pages 295 to 299.

Food Technology, October 1949, pages 332 to 336.

Oil & Soap, October 1943, pages 193 to 196.

Oil & Soap, January 1945, pages 1 to 3.

Bauernfeind et al.: "Retardation of Rancidity in Frozen Fish by Ascorbic Acid," reprint from "Quick Frozen Food Magazine," No. 8, March 1948, and No. 9, April 1948 (page 3 relied on).

SAMUEL H. BLECH, *Primary Examiner.*

ABRAHAM H. WINKELSTEIN, JULIUS GREENWALD, ALBERT T. MEYERS, *Examiners.*

R. S. AULL, M. WEINBLATT, *Assistant Examiners.*